(12) United States Patent
Peterson

(10) Patent No.: US 11,990,037 B2
(45) Date of Patent: May 21, 2024

(54) DRIVING NOTIFICATION SYSTEM AND METHOD

(71) Applicant: Peterson Manufacturing Company, Grandview, MO (US)

(72) Inventor: Rhett Andrew Peterson, Lees Summit, MO (US)

(73) Assignee: Peterson Manufacturing Company, Grandview, MO (US)

( * ) Notice: Subject to any disclaimer, the term of this patent is extended or adjusted under 35 U.S.C. 154(b) by 0 days.

(21) Appl. No.: 17/729,292

(22) Filed: Apr. 26, 2022

(65) Prior Publication Data

US 2023/0343211 A1  Oct. 26, 2023

(51) Int. Cl.
| | | |
|---|---|---|
| G08G 1/052 | (2006.01) | |
| B60W 40/06 | (2012.01) | |
| B60W 40/105 | (2012.01) | |
| B60W 50/14 | (2020.01) | |
| G08G 1/16 | (2006.01) | |

(52) U.S. Cl.
CPC ............ *G08G 1/052* (2013.01); *B60W 40/06* (2013.01); *B60W 40/105* (2013.01); *B60W 50/14* (2013.01); *G08G 1/16* (2013.01); *B60W 2520/28* (2013.01); *B60W 2552/00* (2020.02)

(58) Field of Classification Search
CPC ......... G08G 1/052; G08G 1/16; B60W 40/06; B60W 40/105; B60W 50/14; B60W 2520/28; B60W 2552/00
See application file for complete search history.

(56) References Cited

U.S. PATENT DOCUMENTS

| 11,104,270 B1 * | 8/2021 | Timms ..................... B60Q 1/44 |
| 2016/0039456 A1 * | 2/2016 | Lavoie ................. B62D 15/027 |
| | | 701/41 |
| 2018/0093538 A1 * | 4/2018 | Rothschild ............ B60W 10/04 |
| 2018/0141565 A1 * | 5/2018 | Petrak .................. G07C 5/0825 |
| 2020/0040956 A1 * | 2/2020 | Cremona .............. F16D 66/027 |
| 2020/0231120 A1 * | 7/2020 | Brady ................. B60R 25/2009 |
| 2021/0139074 A1 * | 5/2021 | Fay, II ................. B62D 15/029 |

FOREIGN PATENT DOCUMENTS

KR  100372433 B1 *  2/2003

OTHER PUBLICATIONS

International Search Report and Written Opinion for International Patent Application No. PCT/US2023/066228, dated Jun. 6, 2023.

* cited by examiner

*Primary Examiner* — Mohamed Barakat
(74) *Attorney, Agent, or Firm* — Polsinelli PC; Adam C. Rehm

(57) ABSTRACT

Implementations described and claimed herein address the foregoing by providing systems and methods for driving notification. In one implementation, a method may include the operations of receiving an indication of a speed of a trailer, determining whether a parameter associated with the speed of the trailer meets a threshold, and activating a notification device based on the determination.

19 Claims, 4 Drawing Sheets

DRIVING NOTIFICATION SYSTEM AND METHOD

BACKGROUND

1. Field

Aspects of the present disclosure generally relate to systems and methods for driving notification, and more specifically, for activating notification indicating a speed event associated with a trailer.

2. Discussion of Related Art

A trailer is an unpowered vehicle towed by a powered vehicle. It is commonly used for the transport of goods and materials. The trailer may include various goods which may be transported via the powered vehicle. The trailer may travel on highways where other vehicles are traveling at high speeds. Depending on the size and weight of the trailer, the powered vehicle towing the trailer may have to travel at speeds lower than other vehicles, which may present a danger of an accident if other vehicles are not aware of the trailer moving at a relatively low speed.

SUMMARY

Implementations described and claimed herein address the foregoing by providing systems and methods for driving notification. In one implementation, a method may include the operations of receiving an indication of a speed of a trailer, determining whether a parameter associated with the speed of the trailer meets a threshold, and activating a notification device based on the determination.

In another implementation, an apparatus for driving notification may include a memory and at least one processor coupled to the memory. The at least one processor may be configured to receive an indication of a speed of a trailer, determine whether a parameter associated with the speed of the trailer meets a threshold, and activate a notification device based on the determination.

In another implementation, a non-transitory computer-readable medium having instructions, which when executed by at least one processor, causes the at least one processor to receive an indication of a speed of a trailer, determine whether a parameter associated with the speed of the trailer meets a threshold, and activate a notification device based on the determination.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Certain aspects of the present disclosure are directed to methods and systems for driver notification based on trailer speed. A trailer may include a wheel speed sensor that may generate a signal indicating the trailer's speed. In some cases, the wheel speed sensor may be installed for breaking operations, such as anti-lock breaks (ABS). In certain aspects of the present disclosure, the signal from the wheel speed sensor may be provided to a monitoring system that may control one or more notification elements (e.g., collectively referred to as a notification device). For example, the notification device may include one or more lights, alarms, wireless signal notification element, wired signal notification element, or any combination thereof. The monitoring system may track the trailer's speed via the signal from the wheel speed sensor and activate the notification device accordingly. For instance, if the monitoring system detects that the trailer's speed has reduced (e.g., on a highway) to be below a speed threshold (e.g., 30 MPH), the trailer may activate a notification device, such as a light behind the trailer, to give notice to vehicles that the trailer is traveling at a relatively low speed.

Figure 1:
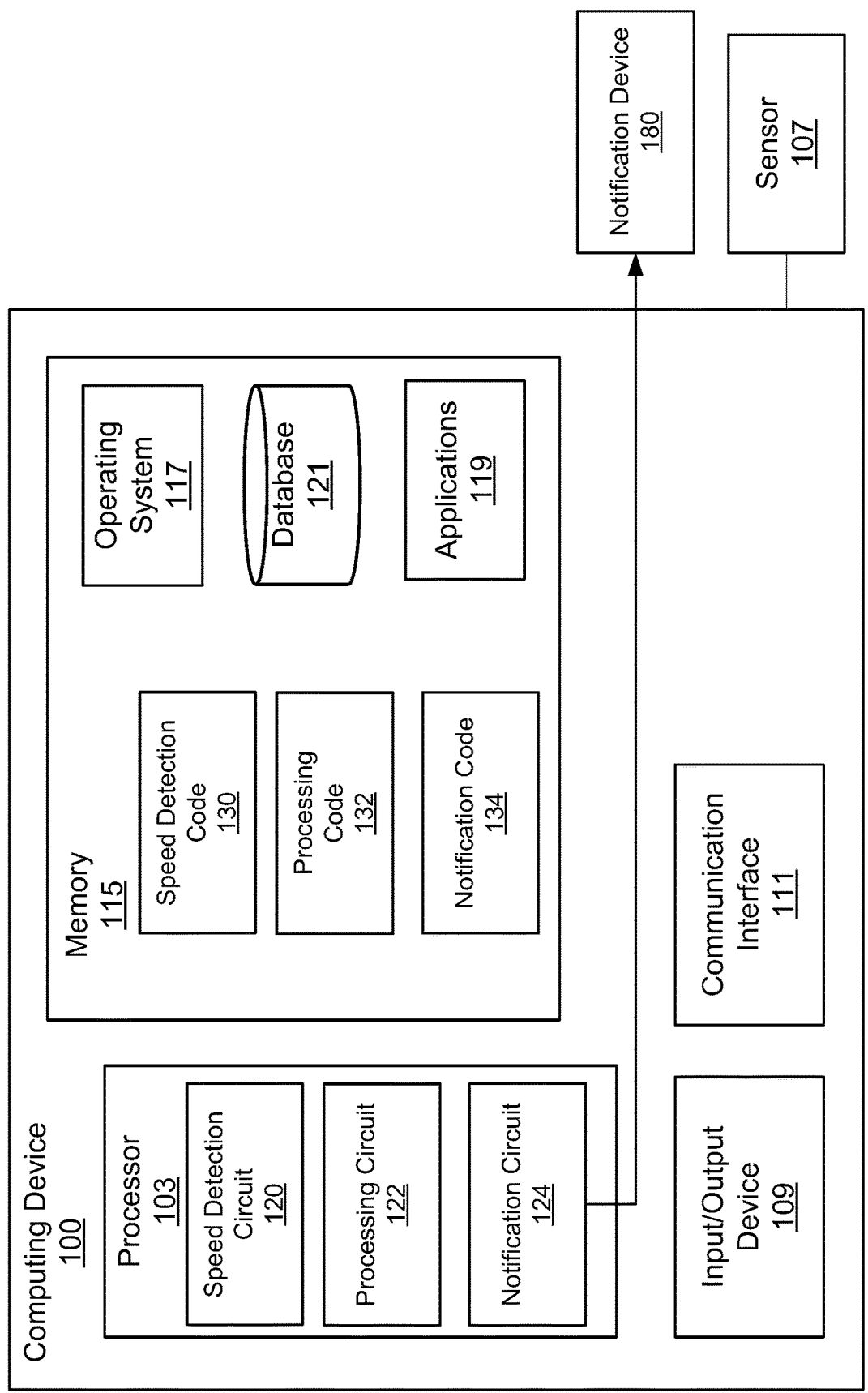
FIG. 1 illustrates an example computing device, in accordance with certain aspects of the present disclosure.

FIG. 1 illustrates an example computing device 100, in accordance with certain aspects of the present disclosure. The computing device 100 can include a processor 103 for controlling overall operation of the computing device 100 and its associated components, including input/output (I/O) device 109, communication interface 111, and/or memory 115 (e.g., non-transitory computer-readable medium). A data bus can interconnect processor(s) 103, memory 115, I/O device 109, and/or communication interface 111.

I/O device 109 can include a microphone, keypad, touch screen, and/or stylus through which a user of the computing device 100 can provide input and can also include one or more of a speaker for providing audio output and a video display device for providing textual, audiovisual, and/or graphical output. Software can be stored within memory 115 to provide instructions to processor 103 allowing computing device 100 to perform various actions. For example, memory 115 can store software used by the computing device 100, such as an operating system 117, application programs 119, and/or an associated internal database 121. The various hardware memory units in memory 115 can include volatile and nonvolatile, removable, and non-removable media implemented in any method or technology for storage of information such as computer-readable instructions, data structures, program modules or other data. Memory 115 can include one or more physical persistent memory devices and/or one or more non-persistent memory devices. Memory 115 can include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Communication interface 111 can include one or more transceivers, digital signal processors, and/or additional circuitry and software for communicating via any network, wired or wireless, using any protocol as described herein. Processor 103 can include a single central processing unit (CPU), which can be a single-core or multi-core processor (e.g., dual-core, quad-core, etc.), or can include multiple CPUs. Processor(s) 103 and associated components can allow the computing device 100 to execute a series of computer-readable instructions to perform some or all of the processes described herein. Although not shown in FIG. 1, various elements within memory 115 or other components in computing device 100, can include one or more caches, for example, CPU caches used by the processor 103, page caches used by the operating system 117, disk caches of a hard drive, and/or database caches used to cache content from database 121. For implementations including a CPU cache, the CPU cache can be used by one or more processors 103 to reduce memory latency and access time. A processor 103 can retrieve data from or write data to the CPU cache rather than reading/writing to memory 115, which can improve the speed of these operations. In some examples, a database cache can be created in which certain data from a database 121 is cached in a separate smaller database in a memory separate from the database, such as in RAM or on a separate computing device. For instance, in a multi-tiered application, a database cache on an application server can reduce data retrieval and data manipulation time by not needing to communicate over a network with a back-end database server. These types of caches and others can be included in various implementations and can provide potential advantages in certain implementations of software deployment systems, such as faster response times and less dependence on network conditions when transmitting and receiving data.

Aspects of the present disclosure provide a monitoring system for interpreting signals from an installed wheel speed sensor and executing the control of a notification device such as lights or alarms based on calculated wheel speeds. In some aspects, the monitoring system may tie into an existing connection between a trailer's wheel speed sensor and ABS module, allowing for monitoring of the wheel speed based on an alternating signal being read from the wheel speed sensor. For example, the frequency of the alternating signal may correspond to the wheel speed. Based on the wheel speed, the monitoring system may execute various control actions based on previously determined speed trigger points, such as whether a particular speed has been reached, whether the speed has dropped to a speed threshold, speed rolls, or whether there is a full stop. For example, the monitoring system may activate a strobe light which may be coupled to the rear of the trailer if the trailer's speed is above 3 miles per hour (MPH) and below 30 MPH.

In some aspects, processor 103 may include circuit 120 for speed detection. For example, circuit 120 may detect a speed of a trailer based on input from sensor 107 (e.g., a wheel speed sensor). The processors 103 may also include circuit 122 for processing. For example, circuit 122 may detect whether to activate a notification device based on a parameter associated with the trailer's speed. For instance, as described, the notification device may be activated if the trailer's speed drops below 30 MPH.

In some cases, the processors 103 may include a circuit 124 for notification. The circuit 124 may control a notification device 180, such as a lamp, light-emitting diode (LED), speaker, wireless or wired communication element, or any suitable means of providing notification to other drivers. The memory 115 may store code that performs the operations described herein when executed by the processor 103. For example, memory 115 may include code 130 for speed detection, code 132 for processing, and code 134 for controlling a notification device. In some aspects, the computing device 100 may be coupled to one or more other sensors (e.g., accelerometer or global positioning system (GPS)), which may be used to receive sensor data for determining whether to activate the notification device 180.

Figure 2:
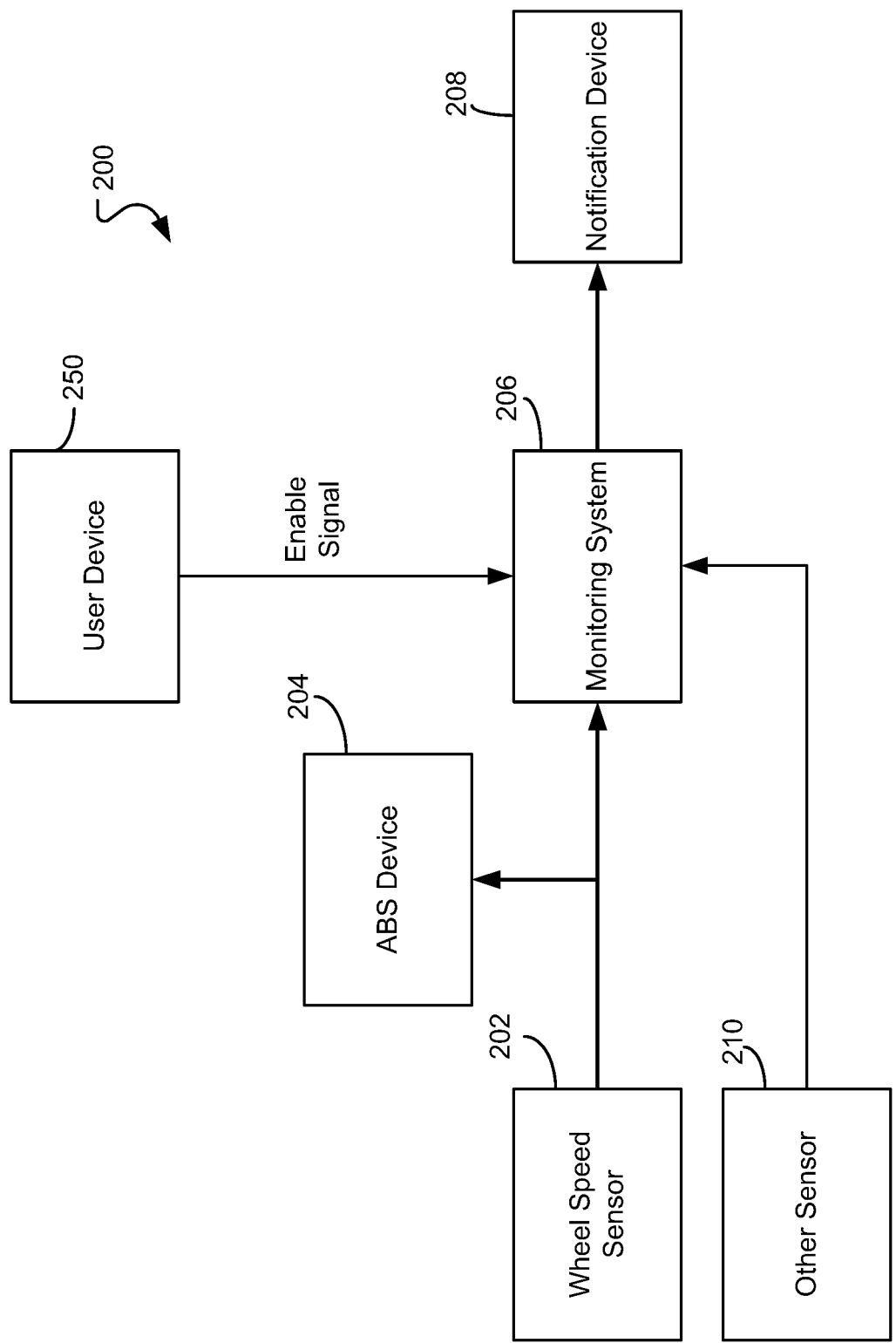
FIG. 2 is a flow diagram illustrating example operations for driver notification, in accordance with certain aspects of the present disclosure.

FIG. 2 is a flow diagram illustrating example operations 200 for driver notification, in accordance with certain aspects of the present disclosure. A wheel speed sensor 202 may provide wheel speed sensor data to a monitoring system 206. As described, the wheel speed sensor data may also be provided to an ABS device 204 for breaking operations. In other words, the wheel speed sensor may be an installed sensor for ABS, which may also be used for speed monitoring and driver notification per aspects of the present disclosure. The monitoring system 206 may include the computing device 100 described with respect to FIG. 1.

The monitoring system 206 may determine a parameter associated with the trailer's speed and control the notification device 208 accordingly. The parameter associated with the trailer's speed may be the speed of the trailer itself, or other parameters such as acceleration or deceleration. For example, the monitoring system may determine whether the trailer's speed has dropped below an upper-speed threshold (e.g., 30 MPH), and activate the notification device 208 accordingly. In some cases, the monitoring system 206 may determine that the speed is between the upper-speed threshold and a lower speed threshold (e.g., 3 MPH) before activating the notification device 208.

In some aspects, the monitoring system 206 may be enabled (or disabled) by a user device 250 (e.g., a device of a driver of a vehicle towing the trailer). For example, the user device 250 may provide an enable signal to the monitoring system 206, enabling the monitoring system to begin tracking the trailer's speed and activate the notification device 208. In other cases, the monitoring system 206 may be enabled automatically depending on the operating condition of the trailer. For example, the monitoring system 206 may be automatically enabled when the trailer is on a highway. The monitoring system 206 may determine the operating condition of the trailer in any suitable manner. For example, the monitoring system 206 may determine that the trailer is traveling on a highway based on input from a GPS or by identifying that the trailer has traveled at high speeds for a certain period.

In some cases, the notification device 208 may be activated if a deceleration of the trailer that is above a threshold is detected. In other words, if a sudden drop in speed is detected, this may be a sign that the trailer (or vehicle towing the trailer) has had an impact with an object. In response, the notification device 208 may be activated.

In some cases, the notification device 208 may be activated if it is detected that the trailer has made a full stop (e.g., the speed of the trailer is zero). In some aspects, the monitoring system may activate the notification device 208 if the speed of the trailer is above a speed threshold (e.g., 70 MPH).

In some aspects, the monitoring system may detect that the trailer is beginning to roll from a stopped position and activate the notification device 208 accordingly. For example, the monitoring system may determine, via sensor data from a sensor 210, that the trailer is on an inclined road. Based on determining that the trailer is beginning to roll and determining that the trailer is on the inclined road, the monitoring system 206 may activate the notification device 208.

In some implementations, the notification device 208 may include different notification elements, such as lights of different colors, light patterns, sounds, or wireless and/or wired notifications. The different notification elements may be activated based on an associated activation event. For example, the trailer making a full stop may result in a first activation element being activated. The trailer having a speed between 3 MPH and 30 MPH may result in a second different activation element being activated. As another example, if the monitoring system 206 detects that the trailer is beginning to roll on an incline, the notification device may send a notification to a computing device of a user (e.g., owner of the trailer or vehicle towing the trailer).

Figure 3:
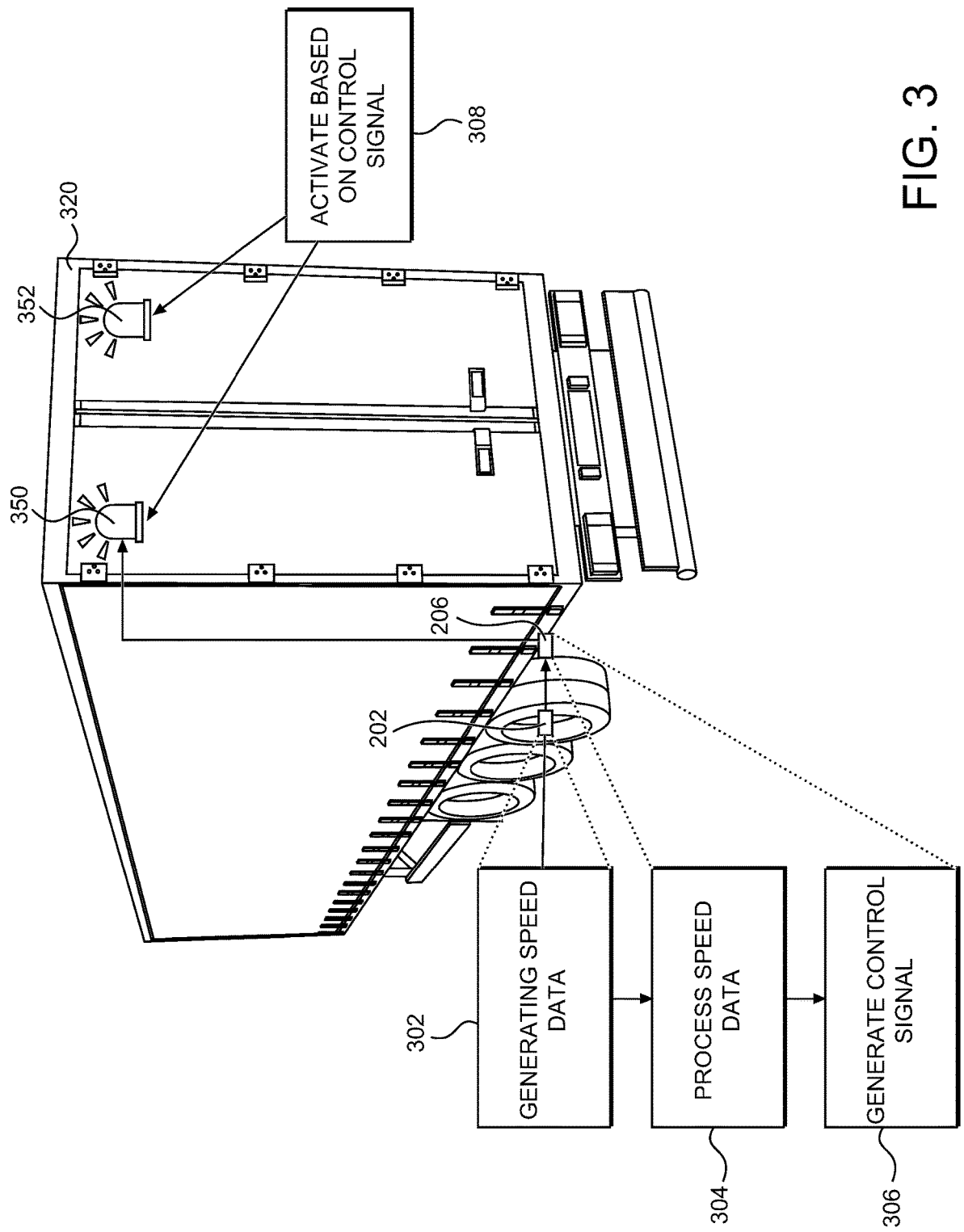
FIG. 3 illustrates a monitoring system implemented on a trailer, in accordance with certain aspects of the present disclosure.

FIG. 3 illustrates a monitoring system implemented on a trailer 320, in accordance with certain aspects of the present disclosure. As shown, at block 302, the wheel speed sensor 202 may generate a signal indicating the vehicle's speed, which may be provided to the monitoring system 206. The wheel speed sensor 202 may be installed behind a brake rotor of the wheel of trailer 320.

As shown, the monitoring system 206 may be installed anywhere on the trailer, such as below the harness of the trailer. At block 304, the monitoring system 206 may process the speed. For example, the monitoring system 206 may determine whether the trailer's speed is between 3 MPH and 30 MPH, as described herein. At block 306, the monitoring system 206 may generate a control signal, which may be used, at block 308, to activate a notification device (e.g., notification element 350 and/or notification element 352).

Figure 4:
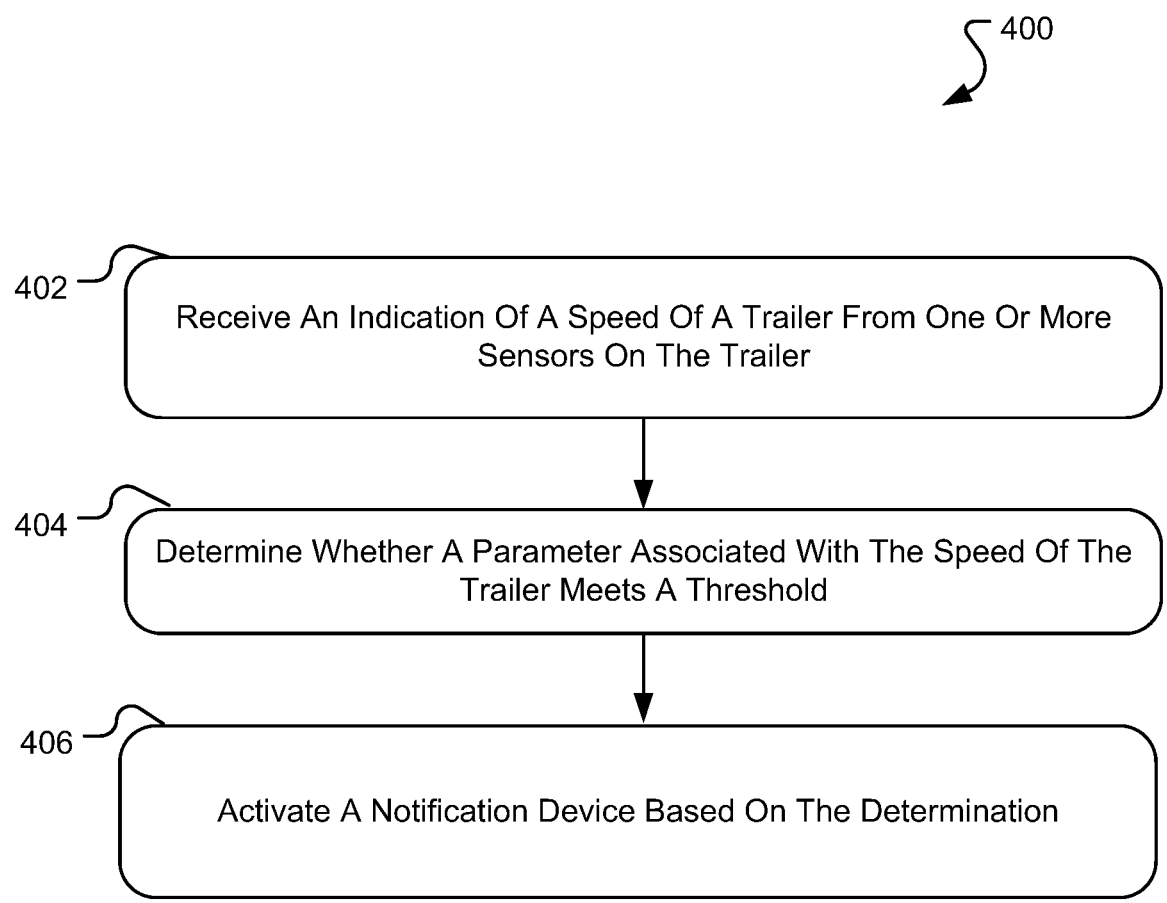
FIG. 4 is a flow diagram illustrating example operations for driving notification, in accordance with certain aspects of the present disclosure.

FIG. 4 is a flow diagram illustrating example operations 400 for driving notification, in accordance with certain aspects of the present disclosure. Operations 400 may be performed, for example, by a monitoring system (e.g., monitoring system 206), such as the processor 103, and in some aspects, the memory 115. In some cases, operations 400 may further be performed by a notification device (e.g., notification device 180) and/or one or more sensors, such as sensor 107.

At block 402, the monitoring system may receive an indication of a speed of the trailer. In some aspects, the indication of the speed of the trailer may be received from one or more speed sensors (e.g., sensor 107 of FIG. 1 or sensor 202 of FIG. 2). The one or more speed sensors may detect the speed of the trailer based on a rotation of one or more wheels. The one or more wheels may include one or more wheels of the trailer.

At block 404, the monitoring system may determine whether a parameter associated with the speed of the trailer meets a threshold. In some aspects, determining whether the parameter meets the threshold may include determining whether the speed is below an upper-speed threshold. In some cases, determining whether the parameter meets the threshold may include determining whether the speed is below the upper-speed threshold and above a lower speed threshold. In some cases, the parameter associated with the speed is a deceleration parameter. In some aspects, determining whether the parameter meets the threshold includes determining whether the trailer has made a full stop (e.g., meets a threshold of zero MPH). In some aspects, determining whether the parameter meets the threshold may include determining whether the speed is above a speed threshold.

At block 406, the monitoring system may activate a notification device based on the determination. In some aspects, determining whether the parameter meets the threshold may include determining that the trailer is beginning to roll from a stopped position. For example, the monitoring system may determine, via sensor data, that the trailer is on an inclined road. The notification device may be activated based on the determination that the trailer is beginning to roll and the determination that the trailer is on the inclined road.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an implementation in the present disclosure can be references to the same implementation or any implementation; and, such references mean at least one of the implementations.

Reference to "one implementation" or "an implementation" means that a particular feature, structure, or characteristic described in connection with the implementation is included in at least one implementation of the disclosure. The appearances of the phrase "in one implementation" in various places in the specification are not necessarily all referring to the same implementation, nor are separate or alternative implementations mutually exclusive of other implementations. Moreover, various features are described which may be exhibited by some implementations and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various implementations given in this specification.

Without intent to limit the scope of the disclosure, examples of instruments, apparatus, methods and their related results according to the implementations of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

What is claimed is:

1. A method for driving notification comprising:
receiving an indication of a speed of a trailer from one or more sensors on the trailer;
determining whether a parameter associated with the speed of the trailer meets a threshold, the parameter being a deceleration parameter corresponding to an impact with an object; and
activating a notification device based on the determination.

2. The method of claim 1, further comprising:
detecting the speed of the trailer based on a rotation of one or more wheels of the trailer.

3. The method of claim 1,
wherein,
the determining of whether the parameter meets the threshold includes determining whether the speed is below an upper speed threshold.

4. The method of claim 3,
wherein,
the determining of whether the parameter meets the threshold includes determining whether the speed is below the upper speed threshold and above a lower speed threshold.

5. The method of claim 1,
wherein,
the determining of whether the parameter meets the threshold includes determining whether the trailer has made a full stop.

6. The method of claim 1,
wherein,
the determining of whether the parameter meets the threshold includes determining whether the speed is above a speed threshold.

7. The method of claim 1,
wherein,
the determining of whether the parameter meets the threshold includes determining that the trailer is beginning to roll from a stopped position.

8. The method of claim 7, further comprising:
determining, via sensor data, that the trailer is on an inclined road, and wherein the notification device is activated based on the determination that the trailer is beginning to roll and the determination that the trailer is on the inclined road.

9. The method of claim 1, wherein the deceleration parameter indicates a sudden drop in speed below a speed threshold.

10. An apparatus for driving notification comprising:
a memory; and
at least one processor coupled to the memory, the at least one processor being configured to:
receive an indication of a speed of a trailer from one or more sensors on the trailer;
determine, via sensor data from the one or more sensors, whether the trailer is on an inclined road;
determine whether a deceleration parameter associated with the speed of the trailer meets a threshold corresponding to an impact with an object; and
activate a notification device based on the trailer being on the inclined road and the deceleration parameter.

11. The apparatus of claim 10,
wherein,
the one or more sensors includes one or more speed sensors configured to detect the speed of the trailer based on a rotation of one or more wheels of the trailer.

12. The apparatus of claim 10,
wherein,
to determine whether the deceleration parameter meets the threshold, the at least one processor is configured to determine whether a deceleration value is below an upper threshold.

13. The apparatus of claim 12,
wherein,
to determine whether the parameter meets the threshold, the at least one processor is configured to determine whether the speed is below the upper speed threshold and above a lower speed threshold.

14. The apparatus of claim 10,
wherein,
to determine whether the deceleration parameter meets the threshold, the at least one processor is configured to determine whether the trailer has made a full stop.

15. The apparatus of claim 10,
wherein,
to determine whether the parameter meets the threshold, the at least one processor is configured to determine whether a deceleration value is above a threshold.

16. The apparatus of claim 10,
wherein,
to determine whether the deceleration parameter meets the threshold, the at least one processor is configured to determine that the trailer is beginning to roll from a stopped position.

17. A non-transitory computer-readable medium having instructions, which when executed by at least one processor, causes the at least one processor to:
receive, via sensor data, an indication of a speed of a trailer;
determine whether a deceleration parameter associated with the speed of the trailer meets a threshold corresponding to an impact with an object; and
activate a notification device based on the deceleration parameter.

18. The non-transitory computer-readable medium of claim 17,
wherein,
to determine whether the deceleration parameter meets the threshold, the instructions cause the at least one processor to determine whether a deceleration value is below an upper threshold.

19. The non-transitory computer-readable medium of claim 17,
wherein,
activating the notification is further based on the trailer beginning to roll from a stopped position caused by an inclined road.

* * * * *